United States Patent [19]  
Nishioka et al.

[11] Patent Number: 4,769,350  
[45] Date of Patent: Sep. 6, 1988

[54] SILICON NITRIDE SINTERED MATERIAL FOR CUTTING TOOLS AND PROCESS FOR MAKING THE SAME

[75] Inventors: Takao Nishioka; Akira Yamakawa; Masaya Miyake, all of Hyogo, Japan

[73] Assignee: Sumitomo Electric Industries, Ltd., Osaka, Japan

[21] Appl. No.: 102,922

[22] Filed: Sep. 30, 1987

[30] Foreign Application Priority Data

Sep. 30, 1986 [JP] Japan ................................ 61-232686  
Dec. 24, 1986 [JP] Japan ................................ 61-310424

[51] Int. Cl.$^4$ ............................................. C04B 35/58
[52] U.S. Cl. .................................... 501/98; 501/97; 501/105; 501/128; 264/56; 264/65; 264/125
[58] Field of Search .................. 501/97, 98, 105, 128; 264/56, 65, 125

[56] References Cited

U.S. PATENT DOCUMENTS 4,327,187 4/1982 Komatsu et al. .................... 501/97  
4,412,009 10/1983 Komatsu et al. .................... 501/98  
4,642,299 2/1987 Hsieh ................................ 501/97

*Primary Examiner*—Stephen J. Lechert, Jr.  
*Attorney, Agent, or Firm*—Sughrue, Mion, Zinn, Macpeak & Seas

[57] ABSTRACT

A silicon nitride sintered material for cutting tools comprising from about 3 to 10 wt % of partially stablized zirconium oxide, from about 1 to 5 wt % of aluminum oxide, and from about 1 to 10 wt % of yttrium oxide, the balance being silicon nitride, and the process for making the same.

8 Claims, No Drawings

SILICON NITRIDE SINTERED MATERIAL FOR CUTTING TOOLS AND PROCESS FOR MAKING THE SAME

FIELD OF THE INVENTION

This invention relates to a silicon nitride sintered material having a high strength and a high toughness, which is suitable for cutting tools, and a process for making the same.

BACKGROUND OF THE INVENTION

As materials for high speed cutting tools for steel and cast iron, composite materials in which a super hard alloy is coated with ceramics, and alumina sintered materials have been used. However, tools of the composite material of a super hard alloy and ceramics have insufficient heat crack resistance, so that the practical cutting speed is restricted at most 300 m/min. On the other hand, tools of the alumina sintered material have superior heat oxidation resistance in high speed cutting and a low chemical reactivity in comparison to the above-mentioned composite material tools, but they are not satisfactory in toughness and heat impact resistance, and are liable to disadvantageously develop a broken edge during continuous cutting (lathe) as well as discontinuous cutting (fraise) when a material to be cut yields discontinuous scraps upon cutting, such as a cast iron.

It is difficult to cut a cast iron material stably at a high speed using conventional cutting tools of the above-mentioned composite material or alumina sintered material.

SUMMARY OF THE INVENTION

An object of this invention is to provide a silicon nitride sintered material for cutting tools, which can be used for stable cutting at a high speed.

Another object of this invention is to provide a silicon nitride sintered material having good wear resistance as well as a high strength and toughness.

A further object of this invention is to provide a silicon nitride sintered material which does not undergo edge damage even under cutting conditions involving a violet heat impact, when used in a wet cutting, a high speed lathe or discontinuous cutting, and the like of cast iron.

A further object of this invention is to provide a process for making such silicon nitride sintered materials.

It has now been found that these and other objects of this invention can be attained by a silicon nitride sintered material for cutting tools comprising from about 3 to 10 wt% of partially stabilized zirconium oxide, from about 1 to 5 wt% of aluminum oxide, from about 1 to 10 wt% of yttrium oxide, the balance being silicon nitride.

DETAILED DESCRIPTION OF THE INVENTION

The silicon nitride sintered material for cutting tools according to this invention can be produced by a process comprising the steps of mixing from about 3 to 10 wt% of partially stabilized zirconium oxide powder, from about 1 to 5 wt% of aluminum oxide powder, from about 1 to 10 wt% of yttrium oxide powder, and the balance of silicon nitride powder; and sintering the resulting mixed powder at from about 1,600° to 1,900° C. in an atmosphere of non-oxidative gas. The non-oxidative gas is preferably nitrogen gas. The priod of time for sinterring is preferably from 2 to 5 hours.

The silicon nitride powder preferably contains at least about 40 wt%, more preferably from about 40 to 60 wt%, of $\beta$-phase cristals ($\beta$-$Si_3N_4$). Such a silicon nitride powder can be obtained, e.g., by subjecting a commercial $\alpha$-phase crystal powder, preferably an amorphous $Si_3N_4$ powder, to heat treatment at from about 1,600° to 1,900° C. in an atmosphere of nitrogen gas at form about 1 to 10 atm for from about 3 to 6 hours to convert at least a part therof into $\beta$-phase crystals. If desired, the entire silicon nitride powder may be $\beta$-phase cryltals.

The partially stabilized zirconium oxide is a $ZrO_2$ containing partially stable cubic crystals, and is described in detail, e.g., in R. C. Garvie et al, *Nature*, vol. 258, pp 703 (1975) and N. Claussen et al, *Proc. 4th Int, Meeting on the Modern Cer. Tech.*, Elsevier Sci. Pub. Co., Amsterdam, Oxfdord, N.Y., pp 680 (1980). The prtially stabilized zirconium oxide may be produced, as is known in the art, by heating in an inert gas (e.g., argon gas) $ZrO_2$ at elevated temperature (e.g., at 1,000° to 1,400° C. for 2 hours) with a suitable amount (e.g., 3 to 8 mol%) of an oxide yttrium, calcium, magnesium and the like. A $ZrO_2$ partially stablized with $Y_2O_3$ is preferred.

In the silicon nitride sintered material for cutting tools according to this invention, the most amount, oreferably at least about 90%, of $Si_2N_4$ is in a $\beta$-phase, and the partially stabilized $ZrO_2$ is depersed in the $Si_3N_4$ matrix, so that the silicon nitride sintered material has a very high toughness in addition to its inherent high hardness and heat stability, and has a high heat conductivity and a small heat expansion coefficient. Therefore, its application for cutting tools provides cutting tools of far longer life than previous tools of alumina sintered materials without edge damage, chipping, etc. when used in lathe processing or wet cutting processing with a violent heat cycle.

The partially stabilized zirconium oxide is used to improve the sintering properties of silicon nitride and to increase the toughness of the resulting sintered material. According to this invention, $Y_2O_3$, MgO, or the like, which is in a form of a solid solution in partially stabilize $ZrO_2$, contributes the improvement in sintering properties upon sintering, whereas even the addition of $Y_2O_3$ itself as a sintering assistant in the use of unstabilized $ZrO_2$ cannot provide sufficient improvement in sintering properties. Additionally, the process according to this invention gives a mixture of cubic and tetragonal crystals of $ZrO_2$ in the sintered material resulting in a contribution of a high toughness of the sintered material. The ratio of the cubic and tetragonal crystals is not limited.

The content of the partially stabilized $ZrO_2$ is from about 3 to 10 wt%; when it is less than about 3 wt%, the toughness of the silicon nitride sintered material improves little, and when it is more than about 10 wt%, the strength and hardness of the silicon nitride sintered material decreases to a great extent.

Further, the addition of aluminum oxide and yttrium oxide is necessary for the improvement of the sintering property and the compactization and high strengthening of the silicon nitride powder, which is difficult to be sintered by itself. If less than about 1 wt% of $Al_2O_3$ or $Y_2O_3$ is used, an insufficient compactability of the sintered material results, and using more than about 5 wt% of $Al_2O_3$ or more than about 10 wt% of $Y_2O_3$ remarkably decreases the strength and hardness of the sintered material, especially at an elevated temperature.

In a preferred embodiment according to the process of this invention, since not only an ordinary α-phase crystal but also at least about 40% of β-phase crystals of $Si_3N_4$ powder are used as a starting silicon nitride powder, a remarkable phase change from α-phase to β-phase crystal and growth of crystal particles are minimized upon sintering. Therefore, the resulting silicon nitride sintered material has a high density and strength as well as high hardness and improved wear resistance. To attain such effects, it is preferred to use a $Si_3N_4$ powder containing at least about 40% of a β-phase crystal.

In order to obtain a sintered material having uniform fine particulate texture, the starting $Si_3N_4$ powder is preferably fine and has a narrow particle size distribution. The starting $Si_3N_4$ preferably has a mean particle size of about 0.5 μm or less, more preferably from about 0.1 to 0.3 μm.

The toughness of the silicon nitride sintered material is remarkably improved by using a hot isostatic press (HIP) under a pressure from about 10 to 2,000 atm in an atmosphere of nitrogen, argon or a mixed gas thereof after the sintering step.

The silicon nitride sintered material according to this invention, as mentioned above, containing from about 1 to 5 wt% of $Al_2O_3$ and from about 1 to 10 wt% of $Y_2O_3$ as sintering assistants, can be produced as a sintered material having a sufficiently high density and high strength not only be pressure sintering such as by using a hot press, but also be normal pressure sintering. This is advantageous in the cost of mass production of many kinds of products such as cutting tools.

Further, in the silicon nitride sintered material for cutting tools according to a preferred embodiment of this invention, the most amount of $Si_3N_4$ is in a compact β-phase phase, and the partially stabilized $ZrO_2$ is dispersed in the β-phase $Si_3N_4$ matrix, to obtain a sintered material having high density and high strength, and at the same time, having especially high hardness, excellent wear resistance, and extremely high toughness.

When the silicon nitride sintered material according to this invention is used to produce cutting tools, the cutting tools obtained have far longer life than those of conventional sintered materials, without damaging and chipping of the edges during fraise processing or wet cutting processing with a violet heat cycle.

The silicon nitride sintered material accoriding to this invention may further contain, e.g., a nitride, oxide, oxynitride, carbide, or boride of IVA, VA, or VIA Group metal of Periodic Table; and SiC, SiC whisker, and $Si_3N_4$ whisker. The silicon nitride sintered material according to this invention can also be produced by a conventional hot press method.

This invention is explained hereinafter in greater detail by reference to the following examples, which are not to be construed as limiting the scope of the present invention. Unless otherwise indicated, all parts, percents, and ratios are by weight.

EXAMPLE 1

The silicon nitride sintered material according to this invention (silicon nitride containing 3 wt% of partially stabilized zirconium oxide, 3 wt% of aluminum oxide, and 3 wt% of yttrium oxide) and β'-Sialon sintered material (a=5, a typical example of conventional silicon nitride materials) were prepared by a hot press method in a graphite mold under the condition as follows.

Temperature: 1,800° C.
Time: 2 hours
Pressure: 150 kg/$cm^2$
Atmosphere: $N_2$ 1.5 atm The samples obtained were measured for bending strength according to JIS R1601 (the term "JIS" used herein refers to "Japanese Industrial Standard") and stress intensity factor $K_{IC}$ according to B. R. Law et al, J. Am. Ceram. Soc., vol. 63 (1980), pp 557. The results obtained are shown in Table 1.

TABLE 1

| Sample | Bending Strength (MPa) | $K_{IC}$ (MPa $\sqrt{m}$) |
| --- | --- | --- |
| This invention | 1,100 | 7.0 |
| β-'Sialon | 750 | 5.6 |

From the results shown in Table 1, it is apparent that the silicon nitride sintered material according to this invention is particularly improved in bending strength and stress intensity factor $K_{IC}$.

EXAMPLE 2

A commercial α-$Si_3N_4$ powder (means particle size: 0.8 μm), a partially stablized $ZrO_2$ powder containing 3 mol% of $Y_2O_3$ (mean particle size: 1 μm), an $Al_2O_3$ powder (mean particle size: 0.5 μm), and a $Y_2O_3$ powder (mean particle size: 0.5 μm) were blended in the ratio as shown in Table 2, ground and mixed in a ball mill, and then hydrauric press-molded at 1.5 ton/$cm^2$. The molding was sintered in an atmosphere of nitrogen gas at 1,750° C. for 2 hours under normal pressure and then HIP-treated in an atmosphere of nitrogen gas at 1,800° C. under a pressure of 1,000 atm.

The resulting sintered material was cut to form throw away chips of 12.7×12.7×4.76 mm according to JIS SNG 433. A cutting test was carried out with the chips under the following conditions and the results are shown in Table 2.

Work: FC 25, (Gray cast iron, $H_B$=230) 150 mm wide×300 mm long
Machine: Vertical-Type Fraise machine
Cutter: DNF 4080 R (made by Sumitomo Electric Industries, Ltd.) one blade-cutting
Cutting conditions:
  Cutting speed: 400 m/min
  Cutting depth: 2 mm
  Feed: 0.2 mm/edge
  Edge treatment: 0.15 mm, −25°
Life rating: Worn width of edge relief surface, 0.3 mm

TABLE 2

| No. | Composition (wt %) | | | | Life (min) |
| --- | --- | --- | --- | --- | --- |
| | $Si_3N_4$ | $ZrO_2$ | $Al_2O_3$ | $Y_2O_3$ | |
| 1 | 89 | 5 | 3 | 3 | 30 |
| 2 | 79 | 15 | 3 | 3 | 9 |
| 3 | 94 | 5 | 0.5 | 0.5 | broken after 5 min |
| 4 | 77 | 5 | 3 | 15 | 5 |
| 5 | 77 | 5 | 15 | 3 | 7 |
| 6 | Sintered material of commercial $Al_2O_3$ matrix* | | | | broken after 5 min |
| 7 | Commercial super hard | | | | 5 |

TABLE 2-continued

| No. | Composition (wt %) | | | | Life (min) |
|---|---|---|---|---|---|
| | $Si_3N_4$ | $ZrO_2$ | $Al_2O_3$ | $Y_2O_3$ | |
| | | coating material** | | | |

Note:
Nos. 2 to 7 are the comparative samples.
*$Al_2O_3$—TiC (HC2, a trademark of NGK Spark Plug Co., Ltd.)
**WC—Co with $Al_2O_3$—TiN coating (AC10, a trademark of Sumitomo Electric Industries, Ltd)

As seen from Table 2, the silicon nitride sintered material according to this invention has excellent in the life and damage resistance when it is used as a cutting tool.

EXAMPLE 3

A commercial α-$Si_3N_4$ powder (mean particle size: 0.8 μm), a partially stabilized $ZrO_2$ powder containing 3 mol% of $Y_2O_3$ (mean particle size: 1 μm), an $Al_2O_3$ powder (mean particle size: 0.5 μm), and a $Y_2O_3$ powder (mean particle size: 0.5 μm) were blended in the ratio shown in Table 2, ground and mixed in a ball mill, CIP-molded (cold isostatic press-molded) under a pressure of 150 MPa, and sintered under the same conditions as in Example 2.

TABLE 3

| No. | Composition (wt %) | | | |
|---|---|---|---|---|
| | $Si_3N_4$ | $ZrO_2$ | $Al_2O_3$ | $Y_2O_3$ |
| 8 | 89 | 5 | 3 | 3 |
| 9 | 74 | 20 | 3 | 3 |
| 10 | 72 | 15 | 3 | 10 |
| 11 | 72 | 15 | 10 | 3 |
| 12 | 93 | 5 | 1 | 1 |
| 13 | 75 | 5 | 10 | 10 |
| 14 | 85 | 5 | 5 | 5 |
| 15 | 94 | 0 | 3 | 3 |

Note:
Nos. 9 to 11, 13, and 15 are the comparative samples.

Break test pieces of 3×3×40 mm according to JIS R1601 were formed by cutting the resulting sintered materials, which were polished and measured for the relative density (%), hardness (Hv), and high temperature hardness at 1,200° C. (Hv). The test results and the life (min) in the same cutting test as in Example 2 are shown in Table 4.

TABLE 4

| No. | Density (%) | Hardness (Hv) | High temperature hardness (Hv) | Life (min) |
|---|---|---|---|---|
| 8 | 99 | 1,750 | 1,100 | 30 |
| 9 | 95 | 1,560 | 1,000 | 8 |
| 10 | 98 | 1,690 | 920 | 5 |
| 11 | 98 | 1,700 | 800 | 5 |
| 12 | 98 | 1,720 | 1,050 | 18 |
| 13 | 98 | 1,700 | 750 | 3 |
| 14 | 99 | 1,740 | 980 | 7 |
| 15 | — | 1,700 | 950 | 3 |

Note:
Nos. 9 to 11, 13, and 15 are comparative samples.

As seen from Table 4, the silicon nitride sintered material according to this invention has excellent in hardness, high temperature hardness, and life.

EXAMPLE 4

A commercial α-$Si_3N_4$ powder (mean particle size: 0.8 μm) was subjected to the heat treatment in an atmosphere of $N_2$ gas at 1,800° C. for 3 hours under a pressure of 9 atm. It was found that the resulting $Si_3N_4$ powder contained 60% of β-$Si_3N_4$ by means of X-ray diffraction.

The resulting $Si_3N_4$ powder was blended with a $ZrO_2$ powder partially stablized with 3 mol% of $Y_2O_3$ (mean particle size: 1 μm), an $Al_2O_3$ powder (mean particle size: 0.5 μm), and a $Y_2O_3$ powder (mean particle size: 0.5 μm) in the ratios shown in Table 5, ground and mixed in a ball mill, and press-molded. The molding was sintered in an atmosphere of $N_2$ gas at 1,750° C. for 2 hours under normal pressure and then HIP-treated in an atmosphere of $N_2$ gas at 1,800° C. under a pressure of 1,000 atm.

The resulting sintered material was cut to form throw away chips of 12.7×12.7×4.76 mm according to JIS SNG 433. The cutting test was carried out with the chips under the following conditions, and the results are shown in Table 5.

Work: FC 25, 150 mm wide×300 mm long
Cutter: DNF 4080 R (made by Sumitomo Electric Industries, Ltd.) one blade-cutting
Machine: Vertical-Type Fraise machine
Cutting conditions:
　Cutting speed: 400 m/min
　Cutting depth: 3 mm
　Feed: 0.3 mm/edge
　Edge treatment: 0.20 mm, −25°
Life rating: worn width of edge relief surface, 0.3 mm

TABLE 5

| No. | Composition (wt %) | | | | Life (min) |
|---|---|---|---|---|---|
| | $Si_3N_4$ | $ZrO_2$ | $Al_2O_3$ | $Y_2O_3$ | |
| 16 | 89 | 5 | 3 | 3 | 25 |
| 17 | 79 | 15 | 3 | 3 | 7 |
| 18 | 94 | 5 | 0.5 | 0.5 | broken after 3 min |
| 19 | 77 | 5 | 3 | 15 | 4 |
| 20 | 77 | 5 | 15 | 3 | 6 |
| 21 | Sintered material of commercial $Al_2O_3$ matrix* | | | | broken after 0.3 min |
| 22 | Commercial super hard coating material** | | | | 4 |

Note:
Nos. 17 to 22 are the comparative samples.
*, **Same as in Example 2

As seen from Table 5, the silicon nitride sintered material according to this invention is excellent, especially in life and damage resistance.

EXAMPLE 5

A commercial α-$Si_3N_4$ powder (mean particle size: 0.8 μm) was heat-treated in an atmosphere of $N_2$ gas under 5 atm at 1,650° to 1,800° C. for 0.5 to 3 hours. The content of β-phase crystal (β/α ratio) of the resulting $Si_3N_4$ powder was determined by means of X-ray diffraction, and the results are shown in Table 6. Samples were prepared by blending 86 wt% of $Si_3N_4$ powder having different contents of β-phase crystals with 8 wt% of $ZrO_2$ powder partially stabilized with 3 mol% of $Y_2O_3$ (mean particle size: 1 μm), 3 wt% of $Al_2O_3$ powder (mean particle size: 0.5 μm), and 3 wt% of $Y_2O_3$ powder (mean particle size: 0.5 μm), and sintered in the same manner as in Example 2.

Throw away chips according to JIS SNG 433 were formed from the resulting sintered materials, and the cutting test was carried out under the following conditions. The results are shown in Table 6.

Work: FC 25 200 mm diameter×300 mm long
Machine: NC Type lathe
Cutting conditions:

Cutting speed: 600 m/min
Cutting dpeth: 2 mm
Feed: 0.36 mm/rev.
Life rating: $V_B = 0.3$ mm

TABLE 6

| No. | β/α of Si$_3$N$_4$ | Life (min) |
| --- | --- | --- |
| 23 | 50/50 | 11 |
| 24 | 70/30 | 13 |
| 25 | 90/10 | 15 |
| 26 | 10/90 | 8 |

As seen from Table 6, the silicon nitride sintered material according to this invention, in which a silicon nitride containing at least 40% of β-phase crystals is used, is excellent especially in life and damage resistance.

EXAMPLE 6

Si$_3$N$_4$ powder obtained in the same manner as in Example 5 and each having a different content of β-phase crystals was blended with a ZrO$_2$ powder partially stabilized with 3 mol% of Y$_2$O$_3$ (mean particle size: 1 μm), an Al$_2$O$_3$ powder (mean particle size: 0.5 μm), and a Y$_2$O$_3$ powder (mean particle size: 0.5 μm) in the ratios shown in Table 7 (the mixing ratios of Nos. 23 to 26 are the same as that in Example 5), HIP-molded under 150 MPa and sintered in the same manner as in Example 4.

TABLE 7

| | Composition (wt %) | | | |
| --- | --- | --- | --- | --- |
| No. | Si$_3$N$_4$ (β/α ratio) | ZrO$_2$ | Al$_2$O$_3$ | Y$_2$O$_3$ |
| 23 | 86 (50/50) | 8 | 3 | 3 |
| 24 | 86 (70/30) | 8 | 3 | 3 |
| 25 | 86 (90/10) | 8 | 3 | 3 |
| 26 | 86 (10/90) | 8 | 3 | 3 |
| 27 | 79 (70/30) | 15 | 3 | 3 |
| 28 | 91 (70/30) | 8 | 0.5 | 0.5 |
| 29 | 79 (70/30) | 8 | 3 | 10 |
| 30 | 79 (70/30) | 8 | 10 | 3 |

Note:
Nos. 27, 28, and 30 are comparative samples.

Test pieces were cut from the resulting sintered materials and evaluated. The test results for relative density (%), room temperature hardness (Hv), and high temperature hardness at 1,200° C. (Hv) are shown in Table 8.

TABLE 8

| No. | Density (%) | Room temperature hardness (Hv) | High temperature hardness (Hv) |
| --- | --- | --- | --- |
| 23 | 99 | 1,700 | 920 |
| 24 | 99 | 1,730 | 940 |
| 25 | 99 | 1,780 | 950 |
| 26 | 98 | 1,620 | 870 |
| 27 | 95 | 1,590 | 870 |
| 28 | 93 | 1,530 | 820 |
| 29 | 97 | 1,620 | 760 |
| 30 | 98 | 1,630 | 780 |

Note:
Nos. 27, 28 and 30 are comparative samples.

As seen from Table 8, the silicon nitride sintered material according to this invention, in which a silicon nitride powder containing at least 40% of β-phase crystal is used, is excellent especially in the hardness.

Accorrding to this invention, it is possible to provide a silicon nitride sintered material for cutting tools, which has an extremely high hardness and a high toughness, in addition to the inherent high strength and heat stability of the silicon nitride sintered material. The silicon nitride sintered material for cutting tools according to this invention is excellent in wear resistance and damage resistance and has far longer life than conventional ceramic tools of alumina matrix, even under cutting condition of a violent heat cycle.

While the invention has been described in detail and with reference to specific embodiments thereof, it will be apparent to one skilled in the art that various changes and modifications can be made therein without departing from the spirit and scope thereof.

What is claimed is:

1. A silicon nitride sintered material for cutting tools consisting essentially of from about 3 to 10 wt% of partially stablized zirconium oxide, from about 1 to 5 wt% of aluminum oxide, and from about 1 to 10 wt% of yttrium oxide, the balance being silicon nitride.

2. A process for making a silicon nitride sintered material for cutting tools comprising the steps of:
   (a) mixing from about 3 to 10 wt% of partially stabilized zirconium oxide powder, from about 1 to 5 wt% of aluminum oxide powder, from about 1 to 10 wt% of yttrium oxide powder, and the balance of silicon nitride powder;
   (b) and sintering the mixture in a non-oxidative gas atmosphere at about 1,600° to 1,900° C.

3. A process for making a silicon nitride sintered material for cutting tools as claimed in claim 2, wherein said mixture is hot isostatically pressed in an atmosphere of nitrogen, argon, or a combination thereof at a pressure of about 10 to 2,000 atm.

4. A process for making a silicon nitride sintered material for cutting tools as claimed in claim 2, wherein said silicon nitride powder contains at least about 40% of β-phase crystals.

5. A process for making a silicon nitride sintered material for cutting tools as claimed in claim 2, wherein said partially stabilized zirconium oxide powder is partially stabilized with an oxide of yttrium, calcium, or magnesium.

6. A process for making a silicon nitride sintered material for cutting tools as claimed in claim 5, wherein said partially stabilized zirconium oxide powder is partially stabilized with yttrium oxide.

7. A process for making a silicon nitride sintered material for cutting tools as claimed in claim 2, wherein the mean particle size of said silicon nitride powder is less than about 0.5 μm.

8. A silicon nitride sintered material comprising cubic and tetragonal crystals of partially stabilized zirconium oxide in a silicon nitride matrix, produced by a process comprising the steps of
   (a) mixing from about 3 to 10 wt% of partially stabilized zirconium oxide powder, from about 1 to 5 wt% of aluminum oxide powder, from about 1 to 10 wt% of yttrium oxide powder, and the balance being silicon nitride powder; and
   (b) sintering the mixture in a non-oxidative gas atmosphere at about 1,600° to 1,900° C.

* * * * *